United States Patent
Battaglia et al.

(10) Patent No.: US 10,414,902 B2
(45) Date of Patent: Sep. 17, 2019

(54) ANTI-CORROSIVE COATING COMPOUND

(71) Applicant: Ewald Doerken AG, Herdecke (DE)

(72) Inventors: Carolina Battaglia, Hagen (DE);
Sandra Boehm, Ennepetal (DE);
Verena Grossmann, Herdecke (DE);
Gerhard Reusmann, Essen (DE);
Marcel Roth, Duesseldorf (DE);
Susanne Walter, Herdecke (DE)

(73) Assignee: Ewald Dörken AG, Herdecke (DE)

( * ) Notice: Subject to any disclaimer, the term of this patent is extended or adjusted under 35 U.S.C. 154(b) by 0 days.

(21) Appl. No.: 14/814,549

(22) Filed: Jul. 31, 2015

(65) Prior Publication Data
US 2016/0032110 A1 Feb. 4, 2016

(30) Foreign Application Priority Data

Aug. 1, 2014 (EP) .................................. 14179500

(51) Int. Cl.
| | |
|---|---|
| *C09D 5/08* | (2006.01) |
| *C09D 183/06* | (2006.01) |
| *C08K 5/41* | (2006.01) |
| *C09D 105/00* | (2006.01) |
| *C09D 5/10* | (2006.01) |

(52) U.S. Cl.
CPC .................. *C08K 5/41* (2013.01); *C09D 5/10* (2013.01); *C09D 5/103* (2013.01); *C09D 5/106* (2013.01); *C09D 105/00* (2013.01); *C09D 183/06* (2013.01)

(58) Field of Classification Search
CPC ....................................................... C09D 5/08
See application file for complete search history.

(56) References Cited

U.S. PATENT DOCUMENTS

| | | | | |
|---|---|---|---|---|
| 4,219,358 | A | * | 8/1980 | Hayashi ................. C09D 5/106 106/1.17 |
| 5,158,605 | A | * | 10/1992 | Kissel ..................... C08J 3/215 106/14.11 |
| 2004/0062873 | A1 | | 4/2004 | Jung et al. |
| 2008/0234417 | A1 | * | 9/2008 | Kruse ..................... C09D 4/00 524/259 |
| 2013/0048917 | A1 | | 2/2013 | Virtanen et al. |

FOREIGN PATENT DOCUMENTS

| | | | |
|---|---|---|---|
| CN | 103911063 A | * | 7/2014 |
| GB | 949734 | | 12/1961 |
| WO | 2005090502 | | 9/2005 |

OTHER PUBLICATIONS

Machine translation of CN 103911063 A, 2014.*

* cited by examiner

*Primary Examiner* — Wenwen Cai
(74) *Attorney, Agent, or Firm* — Edward E. Sowers; Brannon Sowers & Cracraft PC

(57) ABSTRACT

An anti-corrosive coating compound with: component I: cathodically active metal particles and component II: binder in the presence of water. In order to improve the service life of the coating compound, it is provided that an oxygen compound or a mixture of oxygen compounds of the subgroup elements, namely ammonium, alkaline or earth alkaline salts of an acid of a transition metal, is added as component III. The invention further relates to a method for producing an anti-corrosive coating compound, a workpiece coated with the anti-corrosive coating compound and the use of an oxygen compound or a mixture of oxygen compounds of the subgroup elements in an anti-corrosive coating compound.

9 Claims, No Drawings

ANTI-CORROSIVE COATING COMPOUND

BACKGROUND OF THE INVENTION

The invention relates to an anti-corrosive coating compound with metal particles, a method for producing this coating compound and a workpiece coated with this coating compound.

Coating compounds, which act in an anti-corrosive manner and which contain metal particles, are generally known, e.g. from WO 2005/090 502. They primarily contain metal particles for the cathodic corrosion protection, for the most part zinc and/or aluminum particles or zinc alloy particles as well as binders in the presence of water and/or solvents. The binders are often based on silicon-containing compounds; typical binders are inorganic mono-, oligo- or polymers such as silicates, silanes or silanols, but also siloxanes. Depending on the intended use, also organic binders, if applicable also as co-polymers of the inorganic binders, are suitable.

While the coating compounds often offer good corrosion protection after hardening on a workpiece, their stability during use is often problematic since some of the aforementioned components react with the liquid of the coating compound or with the workpieces to be coated. Due to the insertion and extraction of workpieces from an immersion bath, impurities can also be introduced so that undesirable secondary reactions, which reduce the service life of the immersion bath, can occur during the coating. Without a stabilizer, which prevents these undesirable secondary reactions, the service life of a coating compound is often just a few hours. A preparation for a coating compound, e.g. for a coil-coating process, should be usable for at least 48 hours without quality loss, a preparation for an immersion bath a week or more, if possible.

Up until now, boric acid or another boron-containing compound was used to stabilize coating compounds containing metal particles. Due to toxicological concerns with respect to boron compounds and legal requirements, this will no longer be possible in the future.

SUMMARY OF THE INVENTION

The object of the invention is thus to provide a coating compound, which ensures an acceptable service life without the compound of the immersion bath having a boron-containing compound.

This object is solved by the coating compound, the method for producing a coating compound, as well as the workpiece as disclosed herein. Advantageous further developments of the invention are also specified.

DETAILED DESCRIPTION

The coating compound according to the invention—in the presence of water—has the following components:
- component I cathodically active metal particles,
- component II binders and is characterized by the addition of a
- component III, which comprises an oxygen compound or a mixture of oxygen compounds of the subgroup elements, namely ammonium, alkaline or earth alkaline salts of an acid of a transition metal.

The metal particles already named above in the explanation of the state of the art are suitable as metal particles. Above all, zinc particles, mixtures of zinc with other metal particles and zinc alloy particles are used. But aluminum, magnesium and tin, also separately or in a mixture, are also used for the coating compound according to the invention. The metal particles give the coating created by the coating compound cathodic corrosion protection.

For example, silanes, silanols, silicates, titanium- or zirconium-based binders, siloxanes, acrylates, polyurethanes, epoxy-based binders such as polyepoxides, polyethers, polyesters, their mixtures or mixtures of these binders with binders other than those previously named are used as binders. In the case of mixtures of binders, a main binder is often named and further binders are called co-binders. The binders suitable for corrosion protection are known to a person skilled in the art. He selects here from a plurality of available binders.

A coating compound containing a liquid is claimed. According to the invention, the li-quid is water. Since it is attempted if possible to produce a coating agent that has few or no volatile organic compounds, the coating compound according to the invention has as the liquid water or a mainly hydrous liquid, which contains portions of organic solvents or monomers. Preferred solvents like alcohols, ethers, glycol ethers, ketones, aromatic or aliphatic compounds but also monomers of binders, e.g. silanes, are named here only as examples.

The components I (cathodically active metal particles) and II (binders) described above already form an anti-corrosive coating compound in the presence of water, which is used in many cases industrially. Essential for the invention is the addition of an oxygen compound or a mixture of oxygen compounds of the subgroup elements, namely ammonium, alkaline or earth alkaline salts of an acid of a transition metal, to such a coating compound. Such oxygen compounds are preferably used at the highest oxidation level. Typical examples of these substances that are particularly suitable for the invention are salts of the acid of a transition metal. In terms of this invention, transition metals include the elements of the third and fourth subgroup as well as in particular of the fifth, sixth or seventh subgroup, including vanadium, niobium, tantalum, chromium, molybdenum, wolfram, manganese and rhenium.

In particular, an alkaline or earth alkaline salt, an ammonium salt or an oxalate of elements of the third, fourth, fifth, sixth or seventh subgroup, for example an alkaline or earth alkaline salt of a permanganate, wolframate or molybdate, of an ammonium molybdate or of a polyoxalate of the vanadium, niobium or tantalum are essential components of the coating compound according to the teaching of the invention. In the following, this component essential to the invention is referred to in combination as "salts." Among the salts of the acids of the transition metals, both salts of Lewis acids, e.g. potassium permanganate, or salts of Brönstedt acids, e.g. vanadium polyoxalates are suitable. The salts can be used individually or in a mixture. The salts can also be called polyoxometalates, e.g. according to the nomenclature as per "Heteropoly and Isopoly Oxometalates," M. T. Pope, Springer Verlag Berlin, 1983.

In particular, potassium permanganate, ammonium molybdate or potassium wolframate delay undesirable reactions in the coating compound, which could impair the usability of the coating compound. Potassium permanganate and the other named salts act as a stabilizer and extend considerably the service life of the coating compound. The mode of action is not known in greater detail.

The pretreatment of zinc surfaces with permanganates is known from GB 949,734. The pretreatment is performed in order to better anchor subsequently applied conversion coatings on the metal surface. This aspect is not significant for the present invention since no other coatings should be applied to the metal particles. However, it cannot be excluded for the present invention that the addition of the salts is based on a reaction with the metal particles. An advantageous effect is potentially achieved through this reaction in the presence of binders, in which undesirable reactions between components of the coating compound are prevented, which were previously induced by the untreated metal particles. Thus, under certain circumstances, a reaction takes place, which can be called phlegmatization of the metal particles. The bath stability, i.e. the time period within which workpieces made of metal can be coated with the coating compound, is significantly extended by the addition of the salt used according to the invention without the anti-corrosive properties of the metal particles, i.e. the cathodic corrosion protection, being adversely affected by the addition of the salt.

The oxides of the transition metals (not part of the invention), in particular of the elements of the third and fourth subgroups as well as in particular of the fifth, sixth or seventh subgroup, including vanadium, niobium, tantalum, chromium, molybdenum, wolfram, manganese and rhenium are also suitable for significantly extending the bath stability of a coating compound without the corrosion protection effect of the coating applied to the workpiece being adversely affected. For example, vanadium-(V)-oxide $V_2O_5$, niobium-(V)-oxide $N_2O_5$ and tantalum-(V)-oxide $Ta_2O_5$ can be used with success, but chromium-(III)-oxide $Cr_2O_3$, or chromium-(VI)-oxide $CrO_3$ as well as molybdenum-(VI)-oxide $MoO_3$, wolfram-(VI)-oxide $WO_3$, manganese-(II)-oxyhydrate $MnO_2 \times H_2O$, manganese-(IV)-oxide $MnO_2$ and manganese-(VII)-oxide $Mn_2O_7$ and also rhenium-(VII)-oxide $Re_2O_7$ are just as suitable to improve the bath stability without impairing the corrosion protection of the coating applied to the workpiece.

It should be considered an advantage of the invention that the phlegmatization of the metal particles does not require a separate pretreatment. Rather, the addition according to the invention of an oxygen compound of the subgroup elements, preferably of a salt of the acid of a transition metal or of a mixture of these compounds to the generally known coating compound made of metal particles and binders can take place. Neither is a subsequent separation of the component III from the known coating compound required since it does not have a disadvantageous effect in the coating applied and hardened on the workpiece, which results from the coating compound.

The oxygen compound of the subgroup elements used as a stabilizer according to the invention, i.e. of the salt of the acid of a transition metal or of a mixture of the aforementioned compounds is used in quantities of 0.001 weight-% in relation to the solid matter of the coating compound to 10.0 weight-% in relation to the solid matter of the coating compound. The lower limit results from the fact that lower quantities of component III do not effectuate an acceptable extension of the service life. The upper limit results from cost considerations but also from the fact that e.g. the solubility limit of the salt is reached or, e.g. as observed for potassium permanganate, an excessive use causes an undesirable heat development during the production of the coating compound. The oxygen compound of the subgroup elements is preferably used in a quantity of 0.05 weight-% to 5 weight-%.

The coating compound generally has additional components. These are e.g. additives, which promote the bath characteristics, the quality of the coating and other parameters in connection with the processing of the coating compound (progression of the coating, drying, film formation, etc.). A defoamer or a mixture of defoamers is almost always added as component IV. Typical defoamers are mineral oil defoamers or silicone defoamers like e.g. polyether siloxanes. The addition of defoamers ensures a frictionless processing of the coating compound according to the invention.

The addition of a component V, i.e. of a wetting agent or of a mixture of wetting agents, is also common. Wetting agents are used for the improved binding of the coating to the surface of the workpiece to be coated. But, the component V can also comprise wetting and dispersing additives, which additionally ensure the homogeneity of the coating compound in that they prevent a settling or separation of individual elements or components. Known wetting agents or respectively wetting and dispersing agents are categorized as cationic, anionic and non-ionic wetting agents. Frequently used wetting and dispersing agents are e.g. ethoxylated alcohols such as e.g. alkylphenol ethoxylates but also ethoxylated fatty acids. Typical wetting agents are alkyl ether sulfonates, alkyl sulfosuccinates and dialkyl sulfosuccinates such as e.g. dioctyl sodium sulfosuccinates.

The use of thickeners or of a mixture of thickeners, which are added if applicable to the coating compound as component VI, also positively affects the quality of the coating. Typical thickeners are cellulose derivatives like hydroxyethyl cellulose, methyl cellulose, methyl ethyl cellulose, methyl hydroxypropyl cellulose, ethyl hydroxyethyl cellulose or sugar derivatives such as e.g. xanthan gum as a natural representative of the thickening agents. But layered silicates or pyrogenic silicic acid as well as polyurethane compounds also count as known thickeners.

Depending on the use, facultative corrosion protection additives, i.e. substances that further improve the corrosion protection, are added to the coating compound according to the invention. Typical corrosion protection additives are e.g. phosphorus compounds like phosphonic acids or their salts and phosphates as well as citrates, ascorbates or molybdates. Other stabilizers such as e.g. aliphatic nitrates or also mono- or oligo-nitrates of the benzoic or salicylic acids, which improve the corrosion protection, can also be added to the coating compound.

However, the coating compound can also contain further additives, e.g. pigments or dyes for generating colored coatings, lubricants, anti-settling agents or pH regulators. The aforementioned pigments can also be metal particles. However, metal particles, which are called pigments in connection with this invention, have no anti-corrosive effect; they only have a coloring effect.

The coating compound according to the invention is suitable for application to the surface of workpieces, in particular metal workpieces. It acts in an anti-corrosive manner, in particular through the metal particles, which establish effective rust protection in a cathodic manner. It should be considered a special advantage of the invention that the compounds of the transition metals added according to the invention do not impair this corrosion protection.

The coating compound according to one aspect of the invention can be applied e.g. through splashing, spraying, immersion, pouring or through an immersion-centrifuge method. It is frequently used to produce an immersion bath, but can also be used readily e.g. in coil-coating methods, in which the coating compound is applied through splashing or pouring.

The invention further comprises the use of the oxygen compound of the subgroup elements described above in greater detail of a salt of the acid of a transition metal in an anti-corrosive coating agent. This is typically an anti-corrosive coating agent, which has metal particles and binders as well as, if applicable, further additives as they are described in connection with this application. The use of this oxygen compound or a mixture of different such oxygen compounds of the subgroup elements effectuates an improved bath stability while hardly impairing the corrosion protection of the coating on the workpiece.

The subject matter of the invention is also a method for producing a coating compound according to the invention. According to the invention, the component III, i.e. the named compounds of the transition metals individually or in a mixture, is added to the component I (metal particles) in the presence of the component II (binder). The component III can be added during or after the components I and II are mixed. The component III can preferably be added before the addition or in the presence of liquid, advantageously in the presence of 2 weight-% liquid to 90 weight-% liquid. According to a further preferred embodiment, the component III can be added to the coating compound in the presence of further additives named in this application.

Ready-to-use mixtures of the aforementioned components of the coating compound are called a preparation in connection with this invention. Without constant mixing, a preparation in combination does not generally have a long storage life or it requires a transport volume that is too high since it cannot be produced in a concentrated form. A preparation made of a coating compound according to the invention is thus preferred provided as follows at the place of use for coating workpieces: the individual components (metal particles, binders, the oxygen compound of the transition metals used according to the invention and additives) are first produced separately. If possible, several individual components of the coating compound are combined into transport components and transported from the place of manufacture to the place of use. If possible, the transport components are provided in concentrated form in order to minimize transport volumes and thus transport costs. This also guarantees a simple and secure production and an uncomplicated transport of the coating compound. The mixing of the individual components and, if applicable, the addition of liquid to a preparation, i.e. a ready-to-use coating compound, takes place at the place of use.

Metal particles and binders are preferably combined into a transport component A. If necessary, the transport component A can contain further additives, e.g. agents for stabilizing the metal particles. Moreover, the transport component A preferably contains liquid since the metal particles are generally provided as a paste, i.e. with a share of liquid. The binder is also generally not provided in pure form, but rather dissolved, dispersed or suspended in liquid. The transport component A thus contains the essential components of the coating compound, which are applied to the workpiece to be coated.

If desired, further additives can be added to the transport component A or combined in further transport components. For example, additives that significantly affect the performance characteristics of the coating compound are typically combined in a transport component B. The transport component B can thus have some or all of the components listed below: additives for adjusting the pH value, defoamers, wetting agents, which improve the wetting of the workpiece surface by the binder, dyes, pigments, which contribute to an improved corrosion protection or catalysts for the binder, co-binder, which form a common network with the binder.

Since individual additives may not be able to be mixed, transported or stored together under certain circumstances, it may be necessary to prepare a transport component C, e.g. for a thickening agent, which has a disadvantageous impact on the storage and the transport of the transport components A and/or B.

The salt used according to the invention as the stabilizer of the coating compound can (depending on the substance) also be combined with other additives in a transport component. Individual stabilizers such as in particular potassium permanganate are not suitable for incorporation in transport components, e.g. because they react immediately with the other components of the coating compound. They are provided as their own transport component D.

Finally, the subject matter of the invention is a workpiece according to another aspect of the invention. According to the invention, the workpiece is coated with a coating containing metal particles and a compound of a transition metal, i.e. an oxygen compound of a subgroup element, for example a salt of the acid of a transition metal or a mixture of these compounds or the reaction products of these compounds with the metal particles or metal oxides. The coating on the workpiece preferably contains binders. The coating compound applied in liquid form becomes a thin film on the surface of the workpiece and binds there or is hardened to a dry film, typically by air drying or through the effect of heat or radiation.

In addition to the metal particles and, if applicable, even residues of the salt of a subgroup element, their reaction products, which result e.g. from reactions between the metal particles and an oxygen compound introduced according to the invention or of the liquid, which was originally applied with the coating and an oxygen compound or respectively between the binder and an oxygen compound, are also found in the anti-corrosive coating bound or hardened on the workpiece. For example, in addition to zinc particles and potassium permanganate, manganese dioxide is also found in the hardened or respectively bound coating.

Details of the invention are explained in greater detail below using exemplary embodiments.

Exemplary Embodiments Relating to the Use of Salts of Transition Metals

The coating compound according to the invention has at least metal particles, binders and an oxygen compound of a subgroup element. Salts of an acid of a transition metal in the presence of metal particles and binders are preferably used here in liquid form. The coating compound according to the exemplary embodiments explained in detail below can also have even further additives. The components are produced individually, filled according to predetermined percentages by weight and combined into transport components as long as the components do not undergo reactions disadvantageous for the usage properties of the preparation. The combination into transport components according to predetermined percentages by weight simplifies the final production of the immersion bath and thus avoids errors during measuring and joining of the individual components.

If quantities are not specified differently below, the weight-% information is related to the coating compound, i.e. to the total of all components including the liquid, from which a preparation is produced for the coating of metallic workpieces.

Exemplary Embodiment 1

For an anti-corrosive coating compound according to the invention, first the component I, the metal particles, and the component II, the binder, are produced:

Component I:

Metal particles, here zinc particles, are ground as a paste with 10 weight-% white spirit. Aluminum particles, ground with a high-boiling alcohol (boiling point above 100° C.) such as e.g. dipropylene glycol, magnesium particles, tin particles, mixtures or alloys of the aforementioned metals can also be used as metal particles.

Component II

An epoxy silane oligomer, here a bifunctional organosilane, glycidyloxypropyltriethoxy siloxane, is provided water-free with a solid content of 100 weight-%.

The other individual components described in greater detail below are also produced separately. Transport components are then produced from the individual components or elements of the coating compound. It is advantageous if the weight units of the transport components are coordinated so that respectively one container of a transport component is used to produce a preparation for a ready-to-use coating compound.

Transport Component A

Components I and II are stirred together into a transport component A. Respectively in relation to the total weight of the transport component A, 75 weight-% metal particles and 10 weight-% of the binder are thereby added. Ethoxylated alcohol is added in a quantity of 6 weight-% as wetting and dispersing additive. The dispersing additive accelerates and evens out the mixing of the two components I and II. Furthermore, 9 weight-% of an alcohol with a higher boiling point, here dipropylene glycol, are added as the liquid.

Transport Component B

A wetting agent (dioctyl sodium sulfosuccinate), a defoamer (polyether siloxane) and a corrosion protection pigment (molybdate) as well as agents for adjusting the pH value (phosphoric acid) are combined in an aqueous solution. In relation to the total weight of the transport component B, the share of the wetting agent and of the defoamer is respectively 1 weight-%, the corrosion protection pigment is used with 2 weight-% and 1.5 weight-% phosphoric acid is used. The rest of transport component B is water.

Transport component A and transport component B contribute to the coating compound respectively with 65 weight-% and 35 weight-%.

Transport Components C and D

In relation to the solid content of the transport components A and B, after the mixing of the two transport components A and B, 4 weight-% of a thickener (transport component C) and 2 weight-% potassium permanganate (transport component D) are added. This coating compound can be used e.g. for spraying, immersion, pouring or immersion-centrifuge coating methods. One container each of transport components A, B, C and D are stirred together as described below for exemplary embodiment 2. The anti-corrosive coating compound is now ready to use and the coating can begin.

An immersion bath is produced here, the stability, i.e. the suitability for the intended coating of workpieces with an anti-corrosive coating compound, of which is captured. The suitability is determined by checking the coating, which is applied to the surface of the workpiece.

This stability, i.e. the service life of the bath, during which qualitatively constant coatings can be created on workpieces, is maintained for more than 2 weeks.

Exemplary Embodiment 2

Eight experiments are explained here, which were performed with various salts of the acids of transition metals, in order to show the improvement of the stability of coating compounds. If nothing else is mentioned, the compound and production correspond with the coating compound in exemplary embodiment 1.

As shown in Table 1, the component I (the metal particles), here pastes made of zinc flakes and zinc aluminum alloy flakes, and the component II (the binder), here an epoxy silane oligomer, in the presence of organic solvents (dipropylene glycol and 1-nitropropane) are mixed to form a transport component A. Metal particles and binder do not react with each other in a disadvantageous manner even in the case of longer storage periods and can be mixed in connection with the further components or elements described below to form a stable immersion bath or a stable preparation e.g. for the spraying of workpieces.

Further components like defoamers and agents for adjusting the pH value as well as a wetting additive are combined to form a transport component B according to the information in Table 1. The percentages by weight of the various individual components but also of the transport components are designed such that they result in a stable preparation suitable for coating metallic workpieces if coordinated container sizes and the prescribed quantity of liquid are used.

The transport component B with the percentages by weight of the various additives or elements is shown in Table 1. It has: ortho-phosphoric acid, depending on the experiment highly concentrated (85%) and/or heavily diluted (0.1%), sodium water glass (25% solution) for adjusting the pH value, dioctyl sodium sulfosuccinate as a wetting additive and polyether siloxane copolymer as a defoamer.

According to this exemplary embodiment, the transport component C consists of a thickener dissolved or respectively dispersed in water, here xanthan gum. Xanthan gum is used as a 1.5-% solution. The thickener substantially acts on the viscosity and the behavior of the components during the addition of liquid for producing the preparation and is thus preferably produced and delivered as separate transport component C and mixed in as the last component of the preparation.

Alternatively, the components can also be combined in another manner in the transport components. For example, it is also possible to provide additives such as for example preservatives, thickening agents, defoamers and wetting agents with liquid, preferably with water as transport component C. In this case, component B would provide the chemicals required to adjust the pH value in liquid, preferably in an aqueous solution.

As an advantage of the invention, it should be noted that the transport components A, B and C have good storage stability and are also suitable for long transports, e.g. from the place(s) of production of the individual components to the usage location. A storage duration or transportability of 16 weeks is easily achieved. In other words, the production of the coating compound according to the invention can take place centrally and be delivered over long distances to customers, which use immersion baths or other coating systems for creating corrosion protection coatings with metal particles on metal workpieces, so-called base coats.

Unlike the previously usable boron compounds, the component III (transport component D) is not added to one of the transport components A, B or C. It can be that the stabilizing effect of the aforementioned salts of the acids of transition metals is already deployed during the storage and transport of the transport component A and would already be used up during production of the ready-to-use preparation. The transport component D is preferably not mixed, stored or transported in advance with other components of the preparation. It is added directly during production, i.e. right before use of the preparation.

Metal particles and binders are the essential, film-forming elements of an anti-corrosive coating for metallic workpieces. The coating is applied e.g. through spraying or immersion in an immersion bath, for example in an immersion-centrifuge method, in which excess coating agent is removed through centrifugation of the immersed workpieces. The coating agent can be air-drying, but a drying process may also be required in order to harden the coating agent to a dry film bound and firmly adhering on the surface of the workpiece.

We describe below the production of the transport components and the preparation of the coating compound to be mixed from the transport components, which was applied by means of a squeegee for performing the experiments. The production of the transport components A takes place in a manner such that the metal particles are stirred into the provided binder in the form of paste, e.g. by a dissolver. In order to achieve an even distribution, stirring often takes place for 30 minutes to 90 minutes; the stirring continues until homogeneity is reached. The transport component B consists of easy-to-mix components, so that the individual substances are mixed into the provided water with a blade agitator. Only a short stirring time is needed, 5 minutes are sufficient. In the same manner as the transport component B, the transport component C (thickener) is stirred to form an aqueous solution.

The solutions are filled into containers, the size of which is coordinated so that one container of each transport component is mixed with water to produce a preparation. The preparation is preferably produced by mixing the transport components in the order of the transport components, here A, B, C. Should more liquid be needed to adjust the viscosity, water is added. The stirring in or mixing takes place with a conventional tool, e.g. a blade agitator. Due to the metal paste contained in the transport component A, it may be advisable to homogenize it or the preparation by stirring for a longer total time. The transport components can be mixed in almost any order; however, it is advisable to add the thickener as the last component in order to not impede the mixing of the other components with the liquid. The component III, i. e., e.g. potassium permanganate or potassium wolframate require no further preparation; they can be added directly to the preparation through stirring. However, it is advisable to check the temperature of the preparation during the stirring in of the salt and, if applicable, to slow the stirring in if the temperature increases above 40° C. Should a salt according to the invention lead to a temperature increase of the preparation while being stirred in, it is advisable to stir for approx. 10 hours in order to obtain an even, temperature-stable preparation.

Sheets of metal are coated. The coating compound is applied to the sheets of metal with a squeegee. The coating compound is dried for 30 minutes at 300° C. The dried, hardened coating has a thickness (dry film thickness) of 10 µm. The quality of the coating is tested according to DIN EN ISO 9227 in a neutral salt spray test until red rust develops.

The transport components A, B and C, as can be seen in Table 1, are the same for the experiments noted below. The addition of the transport component D, of the salt of the acid of a transition metal and, if applicable, the addition of acid in connection with the salt are varied. The goal is to improve the stability of the immersion bath for coating metallic workpieces with an anti-corrosion layer, i.e. to extend the service life of the coating compound without using boron compounds.

Experiment I is a reference experiment without any stabilizing component. No salt of an acid of a transition metal is added. Experiments with boric acid as reference are not helpful here since boron compounds can no longer be used due to health regulations. For evaluating the experiments, it is specified how many days the immersion bath could be used for the qualitatively acceptable coating of workpieces. Experiment I shows for the bath stability, i.e. for the possible service life of an immersion bath, 0 days. This bath is not economically usable.

Experiment II shows the addition of 0.06% ammonium molybdate in connection with 0.31% phosphoric acid (85%) in the transport component B. The immersion bath according to experiment II could be used for two days for the qualitatively acceptable coating of workpieces. This time period is sufficient if a preparation e.g. for the coating of coil coatings is used. It should be emphasized here that minimal quantities of the salt are already sufficient in order to achieve the desired stabilization of the preparation.

Experiments III to V show the effect of potassium permanganate in different quantities and examine the effect of the acid addition using the example of highly concentrated phosphoric acid. The following quantities of potassium permanganate are used: experiment III: 0.51%, experiment IV: 1.02% and experiment V: 1.02%, respectively in relation to the total paint. 0.31% phosphoric acid (85%) was added to experiments III and IV; experiment V was performed without highly concentrated phosphoric acid. The agents for adjusting the pH value provide for experiment V exclusively water glass and phosphoric acid in a concentration of 0.1%.

The immersion bath according to experiment III was able to be used for 6 days for qualitatively acceptable coatings, the preparation according to experiment IV was usable for 20 days and the preparation according to experiment V was able to be used for 12 days to create qualitatively acceptable corrosion protection coatings. The coating compounds in experiments IV and V are thus particularly suitable for the production of immersion baths.

Potassium permanganate is an inexpensive, readily available component, which by the way does not show disadvantageous effects when using the preparation according to the invention. At most, a certain heating during the production of the preparation according to the invention can be observed, which however does not generally exceed 40° C. and which does not disadvantageously impact the other components of the coating compound. The excellent anti-corrosive effect of the coating on the workpiece should be emphasized here, which reaches more than 2,000 hours of stability in the salt spray test.

TABLE 1

Coating compound without a salt of an acid of a transition metal (compound in % in relation to the total paint)

| Transport Components | Element | Share (%) |
|---|---|---|
| Transport Component A | dipropylene glycol | 5.30 |
| | epoxy silane oligomer | 10.00 |
| | isotridecanole, ethoxylated | 4.00 |
| | 1-nitropropane | 0.75 |
| | zinc flake (in DPG) and zinc aluminum flake (in white spirit) | 45.10 |

TABLE 1-continued

Coating compound without a salt of an acid of a transition metal (compound in % in relation to the total paint)

| Transport Components | Element | Share (%) |
|---|---|---|
| Transport Component B | demi water | 29.64 |
| | $(NH_4)_6Mo_7O_{24} \cdot 4H_2O$ | 0.06 |
| | orthophosphoric acid | 0.50 |
| | sodium water glass | 0.10 |
| | dioctyl sodium sulfosuccinate (wetting additive) | 0.50 |
| | polyether siloxane copolymer (defoamer) | 0.50 |
| Transport Component C | xanthan gum (thickener) | 3.55 |

The experiments VI to VIII were performed with potassium wolframate under conditions otherwise identical to the experiments with potassium permanganate, i.e., in experiment VI, 0.50% and, in experiment VII and experiment VIII, 1.02% potassium wolframate were added with simultaneous addition of 0.31% phosphoric acid (85%). Experiment VIII was performed with 1.02% $K_2WO_4$, however without phosphoric acid (85%). The preparation was usable for 10 days in experiment VI, for 13 days in experiment VII and for 4 days in experiment VIII. A coating compound, which is optimally set for rapidly used up preparations, such as required e.g. for coil coating, can thus also be selected for potassium wolframate. Alternatively, compounds can be produced, which are particularly suitable for immersion baths, in which a longer stability of 10 days or more is expected. The high stability of the coating produced according to the invention should also be emphasized here, the corrosion stability of which is at least 1,200 hours, but which can also be more than 2,000 hours.

TABLE 2

Bath stability in the case of the addition of a salt of an acid of a transition metal to the coating compound in Table 1. (The addition of salts of the acids of transition metals or respectively and, if applicable, of phosphoric acid effectuates a corresponding reduction in the share of water in the coating compound.)

| Experiment | I | II | III | IV | V | VI | VII | VIII |
|---|---|---|---|---|---|---|---|---|
| Component III | / | $(NH_4)_6 Mo_7O_{24} \cdot 4H_2O$ | | $KMnO_4$ | | | $K_2WO_4$ | |
| share of the total compound (weight %) | / | 0.06 | 0.51 | 1.02 | 1.02 | 0.50 | 1.02 | 1.02 |
| orthophosphoric acid 85% (%) | / | 0.31 | 0.31 | 0.31 | / | 0.31 | 0.31 | / |
| bath stability at room temperature (days) | 0 | 2 | 6 | 20 | 12 | 10 | 13 | 4 |
| salt spray test (hours, minimum) | / | | 1500 | 1500 | 1500 | 1600 | 1200 | 2000 |

The addition of salts of acids of the transition metals to coating agents for corrosion protection means directly during the production of the immersion bath stabilizes the immersion baths for a period of 2 to 20 days so that these salts can be used as a replacement for the boron compounds that will soon no longer be available. It is clear that the simultaneous use of acid, e.g. phosphoric acid, contributes to a further, essential increase in the bath stability. It is simultaneously determined that sheets, which were coated with the coating compound disclosed in Tables 1 and 2, show very good values in the salt spray test.

TABLE 3

Bath stability in the case of the addition of an oxide of a transition metal to the coating compound in Table 1 (not according to the invention). (The addition of oxides of transition metals or respectively and, if applicable, of phosphoric acid effectuates a corresponding reduction in the share of water in the coating compound.)

| | Experiment | | |
|---|---|---|---|
| | I | IX | X |
| Component III | / | $MnO_2$ | $MoO_3$ |
| share of the total compound (weight %) | / | 0.25 | 0.5 |
| orthophosphoric acid 85% (%) | / | 0.31 | / |
| bath stability at room temperature (days) | 0 | 5 | 7 |
| salt spray test (hours, minimum) | / | 1000 | |

The addition of oxides of the transition metals to a coating agent (not according to the invention) with an anti-corrosive effect directly during the production of the immersion bath stabilizes the immersion bath by more than 5 days in experiment IX, by 7 days in experiment X. Metal sheets coated with the coating compounds disclosed in Tables 1 and 3 show very good values in the salt spray test ($MnO_2$ at least 1000 hours).

The invention claimed is:

1. An anti-corrosive coating composition having an increased service life comprising the following components:
   (I) metal particles, wherein the metal particles are selected from the group consisting of zinc particles, aluminum particles, magnesium particles, alloys thereof, and mixtures thereof;
   (II) binders;
   (III) an oxygen containing compound or a mixture of oxygen containing compounds selected from ammonium salts, alkali salts or alkaline earth salts of an acid of a transition metal; and (IV) in the presence of water;
wherein the transition metal is selected from the group consisting of vanadium, wolfram, and manganese,
wherein the anti-corrosive coating composition contains the oxygen containing compound or the mixture of oxygen containing compounds of component (III) in a quantity of 0.5 weight-% to 5 weight-%, based on the solid content of the coating composition, and
wherein the anti-corrosive coating composition including component (III) exhibits an increased service life compared to the same composition without component (III).

2. The coating composition according to claim 1, wherein the oxygen containing compound is an oxygen containing compound with the highest oxidation level.

3. The coating composition according to claim 1, wherein the oxygen containing compound or the mixture of the oxygen containing compounds is selected from ammonium, alkali or alkaline earth salts of permanganates or wolframates.

4. The coating composition according to claim 1, wherein silanes, silicates, silanols, titanium- or zirconium-based binders, siloxanes, acrylates, polyurethanes, epoxide-based binders, polyethers or poly-esters are used as binders individually or in a mixture with each other or in a mixture with other binders.

5. The coating composition according to claim 1, wherein a defoamer, a wetting agent, corrosion protection additives, pigments, dyes, lubricants, stabilizers for metal particles, anti-settling means, pH regulators and/or a thickener is added to the coating composition.

6. The coating composition according to claim 1, wherein the transition metal is selected from the group consisting of wolfram and manganese.

7. A method for producing an anti-corrosive coating composition, the composition comprising:
(I) metal particles, wherein the metal particles are selected from the group consisting of zinc particles, aluminum particles, magnesium particles, alloys thereof, and mixtures thereof;
(II) binders;
(III) an oxygen containing compound or a mixture of oxygen containing compounds selected from ammonium salts, alkali salts or alkaline earth salts of an acid of a transition metal; and
(IV) in the presence of water;
wherein the transition metal is selected from the group consisting of vanadium, wolfram, and manganese;
wherein the anti-corrosive coating composition contains the oxygen containing compound or the mixture of oxygen containing compounds of component (III) in a quantity of 0.5 weight-% to 5 weight-%, based on the solid content of the coating composition, and
wherein the anti-corrosive coating composition including component (III) exhibits an increased service life compared to the same composition without component (III);
the method comprising the steps of:
mixing the (I) metal particles and the (II) bonders in the presence of water, and
adding the (III) oxygen containing compounds or the mixture of oxygen containing compounds.

8. The method according to claim 7, wherein the addition of the (III) oxygen containing compound or the mixture of oxygen containing compounds takes place in the presence of one or more additives or wherein the one or more additives are added before, during or after addition of the (III) oxygen containing compound or the mixture of oxygen containing compounds.

9. A workpiece, coated with an anti-corrosive coating composition comprising:
(I) metal particles, wherein the metal particles are selected from the group consisting of zinc particles, aluminum particles, magnesium particles, alloys thereof, and mixtures thereof;
(II) binders;
(III) an oxygen containing compound or a mixture of oxygen containing compounds selected from ammonium salts, alkali salts or alkaline earth salts of an acid of a transition metal; and
(IV) in the presence of water;
wherein the transition metal is selected from the group consisting of vanadium, wolfram, and manganese;
wherein the anti-corrosive coating composition contains the oxygen containing compound or the mixture of oxygen containing compounds of component (III) in a quantity of 0.5 weight-% to 5 weight-%, based on the solid content of the coating composition, and
wherein the anti-corrosive coating composition including component (III) exhibits an increased service life compared to the same composition without component (III).

* * * * *